United States Patent

Pudleiner et al.

[11] Patent Number: 5,861,471
[45] Date of Patent: Jan. 19, 1999

[54] POLYSULPHONE/POLYETHER BLOCK COPOLYCONDENSATES

[75] Inventors: Heinz Pudleiner, Krefeld; Ralf Dujardin, Willich; Rolf Wehrmann; Knud Reuter, both of Krefeld; Helmut-Martin Meier, Ratingen, all of Germany

[73] Assignee: Bayer AC, Leverkusen, Germany

[21] Appl. No.: 632,659

[22] Filed: Apr. 15, 1996

[30] Foreign Application Priority Data

Apr. 28, 1995 [DE] Germany .................. 195 15 689.7

[51] Int. Cl.⁶ .............................. C08G 8/02; A61M 29/00
[52] U.S. Cl. ....................... 528/126; 528/128; 528/171; 528/174; 528/373; 528/391; 604/96
[58] Field of Search .................................. 528/126, 171, 528/174, 128, 373, 391; 604/96

[56] References Cited

U.S. PATENT DOCUMENTS 4,010,147  3/1977  Rose ........................................ 260/79.3

FOREIGN PATENT DOCUMENTS 0 135 938  4/1985  European Pat. Off. .

*Primary Examiner*—Karen A. Dean
*Attorney, Agent, or Firm*—Connolly and Hutz

[57] ABSTRACT

The invention relates to polysulphone/polyether block copolycondensates having the recurring structural unit as in formula (I)

$$-(-O-E-O-Ar^1-SO_2-Ar^2-)-W- \qquad (I)$$

wherein

E is a divalent diphenolate radical and

W is a polyether, polythioether or polyacetal possessing at least two hydroxyl groups and having an average molecular weight ($\bar{M}_n$) of from 400 to 30,000 and wherein the proportion of the radical W in the total polymer amounts to 5 to 99 wt. %, the preparation and use thereof for the production of moulded shapes, for example, membranes or catheter tubes.

7 Claims, No Drawings

POLYSULPHONE/POLYETHER BLOCK COPOLYCONDENSATES

The invention relates to polysulphone/polyether block copolycondensates, a method for their preparation, their use for the production of moulded shapes and the moulded shapes themselves.

Aromatic polysulphones and aromatic polyether ketones and polyether thioketones are known (for example, GB-PS 1 078 237, U.S. Pat. No. 4,010,147 and EP-A 135 938). They can be prepared, for example, by the reaction of dialkali salts of diphenols with dihalodiaryl sulphones in a polar solvent.

It has however been found disadvantageous that these materials have high melting temperatures and for this reason can only with difficulty be processed by extrusion. Moreover, it is desirable that materials for catheter tubes should be flexible and soften in the body through warming on contact with the blood and plasticising through moisture uptake. The above-mentioned polymers do not fulfil these requirements.

It has been found that the polysulphone/polyether block copolycondensates according to the invention can be easily processed at relatively low temperatures, for example, within the range of 150° to 200° C., without the polymer undergoing a distinct decrease in molecular weight during processing. Hence they can be easily processed into moulded shapes and films by extrusion, injection moulding, sintering, moulding or casting from a suitable solvent. The polysulphone/polyether block copolycondensates are distinguished by having a good blood compatibility. Compared with known mixtures of polysulphones and polyethylene glycols they have in addition the advantage that the polyether units incorporated into the polymer cannot be washed out, for example, during use as a membrane or catheter tube.

The invention provides polysuilphone/polyether block copolycondensates having the recurring structural unit as in formula (I)

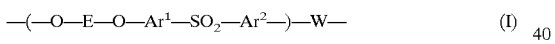

wherein
E signifies a divalent diphenolate radical,
$Ar^1$ and $Ar^2$ signify identical or different difunctional aromatic radicals having 6 to 50, preferably 6 to 25, carbon atoms, and
W represents a polyether, polythioether or polyacetal possessing at least two, preferably two to eight, particularly preferred two to four, most particularly preferred two to three, in particular two hydroxyl groups, and having an average molecular weight ($\overline{M}_n$) of from 400 to 30,000, preferably from 500 to 20,000,
wherein the proportion of the radical W in the total block copolycondensate amounts to 5 to 99 wt. %, preferably 10 to 90 wt. %, in particular 20 to 70 wt. % (referred to 100 wt. % of total polymer).

In the above-mentioned formula (I) E represents preferably a radical of formula (II)

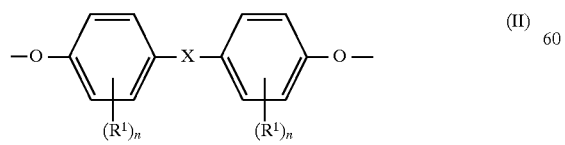

wherein
$R^1$ in each case independently of one another, identically or differently, represents hydrogen, halogen, $C_1$–$C_6$ alkyl or $C_1$–$C_6$ alkoxy, preferably hydrogen, fluorine, chlorine, bromine, methyl, ethyl, n-propyl or isopropyl, n-butyl, isobutyl or tert.-butyl, methoxy, ethoxy, n-propoxy or isopropoxy, n-butoxy, isobutoxy or tert.-butoxy,
n represents an integer from 1 to 4, preferably 1, 2 or 3, in particular 1 or 2,
X stands for a chemical bond, —CO—, —O—, —S—, —SO$_2$—, for alkylene, preferably $C_1$–$C_8$ alkylene, alkylidene, preferably $C_2$–$C_{10}$ alkylidene or cycloalkylene, with the three last-named radicals being substitutable by substituents selected from halogen, in particular fluorine, chlorine, bromine, optionally by phenyl or naphthyl substituted by fluorine, chlorine, bromine, $C_1$–$C_4$ alkyl and/or $C_1$–$C_4$ alkoxy and with cycloalkylene being substitutable in addition by $C_1$–$C_6$ alkyl.

In the case that X represents cycloalkylene, X preferably represents a radical of formula (III)

wherein
Y represents carbon,
$R^2$ and $R^3$ represent, individually selectable for each Y, independently of one another, hydrogen or $C_1$–$C_6$ alkyl, particularly preferred hydrogen or $C_1$–$C_4$ alkyl, in particular hydrogen, methyl or ethyl and
m represents an integer from 3 to 12, preferably 4 to 8, in particular 4 or 5,
X furthermore represents preferably alkylene having the meaning given above,
$Ar^1$ and $Ar^2$ represent independently of one another in each case phenyl optionally substituted by halogen, in particular fluorine, chlorine, bromine and/or nitro, or the radical

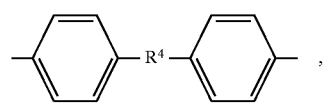

wherein $R^4$ represents $C_1$–$C_6$ alkylene or $C_1$–$C_6$ alkylidene, in particular methylene or —C(CH$_3$)$_2$—, and the phenyl rings can be substituted by halogen, in particular fluorine, chlorine, bromine.

The invention also provides a method for the preparation of the polysulphone/polyether block copolycondensates according to the invention by the reaction of dialkyl diphenolates (as a rule disodium diphenolate) of formula (IIa)

wherein E has the meaning given above,
and di-salts (as a rule disodium salts) of hydroxy-terminated polyethers of formula (IIIa)

wherein W has the meaning given above and Me represents alkali metal, alkaline earth metal or zinc, preferably sodium, with dihalodiaryl sulphones of formula (IVa)

hal—Ar¹—SO₂—Ar²—hal            (IVa), wherein
Ar¹ and Ar² have the meaning given above and
hal represents halogen, preferred fluorine, chlorine or bromine,
in the presence of polar solvents.

The polysulphone/polyether block copolycondensates according to the invention can be prepared by known methods, for example, corresponding to the preparation of aromatic polysulphones (for example, GB-PS 1 078 234, U.S. Pat. No. 4,010,147 and EP-A 135 938).

Suitable polar solvents for the method according to the invention are caprolactam that is $C_1$–$C_5$ alkyl-substituted on the nitrogen atom, such as N-methylcaprolactam, N-ethylcaprolactam, N,n-propylcaprolactam, N-isopropylcaprolactam, and pyrrolidones that are $C_1$–$C_5$ alkyl-substituted on the nitrogen atom, such as N-methylpyrrolidone, N,N-dimethylformamide, N,N-dimethylacetamide, diphenyl sulphone, sulpholane or tetramethylurea, preferably dimethyl sulphoxide.

Other less polar solvents, for example, aromatic hydrocarbons such as toluene, xylene, mesitylene, chlorobenzene, or aliphatic hydrocarbons such as benzine, cyclohexane can be concomitantly used proportionately, for example, 0.1 to 200 wt. %, referred to the weight of the polar solvent. The quantity of solvent is generally from 30 to 90 parts by weight, preferred 40 to 60 parts by weight, referred to the total weight of the compounds of the formulae (IIa), (IIIa) and (IVa) being used.

According to the invention the polysulphone/polyether block copolycondensates can generally be prepared at temperatures of from 130° C. to 320° C., preferably from 145° C. to 280° C., and at pressures of from 0.8 to 10 bar, preferably from 1 to 3 bar, in particular at ambient atmospheric pressure.

The molar ratio of the sum of the alkali diphenolates (IIa) and the dialkali salts of the hydroxy-terminated polyethers (IIIa) to the dihalodiaryl sulphones (IVa) is in general between 0.5 and 2, preferred 0.8 and 1.2, particularly preferred 0.95 and 1.05, with a ratio of 1 or nearly 1 having to be chosen for high molecular weights.

The concentration of the concentrated sodium hydroxide solution used for the formation of alkali diphenolate must correspond to a proportion by weight of solid sodium hydroxide of from 35 to 45%, preferably 40 to 45%. The molar ratio of sodium hydroxide to diphenol or of sodium methanolate to polyether is between 2:1 and 2.02:1, with a molar ratio of 2:1 having to be chosen in each case for particularly high molecular weights.

The polysulphone/polyether block copolycondensates according to the invention in general have a molecular weight ($\overline{M}_n$) of from 5,000 to 50,000, preferred from 8,000 to 40,000, determined by GPC in tetrahydrofuran against polystyrene as molar mass standard.

In an initial reaction step, optionally as a separate reaction, the alkali metal salts are prepared from the hydroxyl groups of the polyether. Suitable solvents are those already mentioned above.

Suitable bases for the preparation of the salts of the polyethers are the alkali metal salts of low-molecular alcohols such as sodium methanolate, potassium methanolate, potassium tert.-butanolate, alkali and alkaline earth hydrides such as sodium amide, potassium amide, potassium bis(trimethylsilyl)amide, lithium diisopropylamide, or metal alkyls such as butyllithium, diethylzinc, sec.-butyllithium, tert.-butyllithium. Sodium methanolate is preferred.

The polysulphone/polyether block copolycondensates according to the invention can be recovered in the following manner from the reaction mixtures obtained.

The reaction mixture, particularly when very highly viscous solutions are present, is diluted with, for example, the polar reaction solvent or another solvent for the polysulphone/polyether block copolycondensate, and is filtered. After the filtrate has been neutralised using a suitable acid, for example, acetic acid or phosphoric acid, the block copolycondensate is precipitated out by being poured into a suitable precipitating medium, for example, water, alcohol (such as, for example, methanol, isopropanol) or water-alcohol mixtures, for example, water/methanol 1:1, isolated and then dried.

The diphenols corresponding to the radical E or to formulae (II) and (IIa) are either known in the literature or can be prepared by methods known in the literature (cf. for example, DE-OS 3 833 396).

Examples of suitable diphenols corresponding to the structural unit of formula (II) are
hydroquinone,
resorcinol,
dihydroxydiphenyls,
bis(hydroxyphenyl)alkanes,
bis(hydroxyphenyl)cycloalkanes,
bis(hydroxyphenyl) sulphides,
bis(hydroxyphenyl) ethers,
bis(hydroxyphenyl) ketones,
bis(hydroxyphenyl) sulphones,
bis(hydroxyphenyl) sulphoxides,
α,α'-bis(hydroxyphenyl)diisopropylbenzenes
as well as the ring-alkylated and ring-halogenated compounds thereof.

These and other additional suitable diphenols corresponding to formula (II) are described, for example, in U.S. Pat. Nos. 3,028,365, 2,999,835, 3,148,172, 3,275,601, 2,991,273, 3,271,367, 3,062,781, 2,970,131 and 2,999,846, in the German Patent Applications DE-OS 1 570 703, 2 063 050, 2 063 052, 2 211 956, in the French Patent Application 1 561 518 and in the monograph "H. Schnell, Chemistry and Physics of Polycarbonates, Interscience Publishers, New York 1964".

Examples of preferred diphenols are
4,4'-dihydroxydiphenyl,
1,1-bis(4-hydroxyphenyl)-3,3,5-trimethylcyclohexane,
2,2-bis(4-hydroxyphenyl)propane,
2,2-bis(4-hydroxyphenyl)-3-methylbutane,
1,1-bis(4-hydroxyphenyl)cyclohexane,
α,α'-bis(4-hydroxyphenyl)-p-diisopropylbenzene,
2,2-bis(3-methyl-4-hydroxyphenyl)propane,
2,2-bis(3-chloro-4-hydroxyphenyl)propane,
bis(3,5-dimethyl-4-hydroxyphenyl)methane,
2,2-bis(3,5-dimethyl-4-hydroxyphenyl)propane,
bis(3,5-dimethyl4-hydroxyphenyl)sulphone,
2,2-bis(3,5-dimethyl-4-hydroxyphenyl)-3-methylbutane,
1,1-bis(3,5-dimethyl-4-hydroxyphenyl)cyclohexane,
α,α'-bis(3,5-dimethyl-4-hydroxyphenyl)-p-diisopropylbenzene,
2,2-bis(3,5-dichloro-4-hydroxyphenyl)propane,
2,2-bis(3,5-dibromo-4-hydroxyphenyl)propane and
4,4'-dihydroxydiphenyl sulphone.

They may be used separately or in a mixture.
Examples of suitable dihalodiaryl sulphones of formula (IVa) are
4,4'-dichlorodiphenyl sulphone,
4,4'-difluorodiphenyl sulphone,
4-chloro-4'-fluorodiphenyl sulphone,
3,3'-dinitro-4,4'-dichlorodiphenyl sulphone, 3,3'-dinitro-4,4'-difluorodiphenyl sulphone,
4,4'-dibromodiphenyl sulphone.

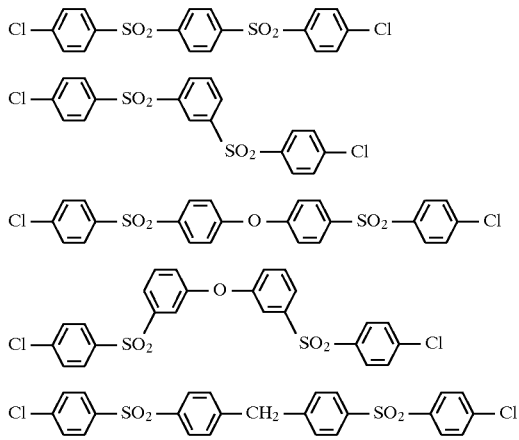

To prepare the polysulphone/polyether block copolycondensates according to the invention, the following compounds can be used as hydroxyfunctional polyethers (radical W in formula (I)): polymers or oligomers having at least two hydrogen atoms reactive with bases and being of a molecular weight ($\overline{M}_n$) as a rule of from 400 to 30,000. By this is meant, apart from compounds possessing thiol groups or amino groups, preferably compounds possessing hydroxyl groups, in particular compounds possessing two to eight hydroxyl groups, preferably those having a molecular weight ($\overline{M}_n$) of from 500 to 20,000, particularly preferred 700 to 8,000, determined by end group determination, for example, polyethers, polythioethers and polyacetals possessing at least two, preferably 2 to 8, particularly preferred 2 to 4, most particularly preferred 2 to 3, in particular two hydroxyl groups.

a) The polyethers are known universally. Polyalkylene ethers, for example, are suitable.

The polyethers are obtained by polymerisation of cyclic ethers (alkylene oxides), for example, ethylene oxide, propylene oxide, butylene oxide, tetrahydrofuran, styrene oxide or epichlorhydrin with themselves or by copolymerisation of several cyclic ethers from this group or stepwise polymerisation of several cyclic ethers from this group (whereby block copolyethers are formed), for example, in the presence of Lewis catalysts such as $BF_3$, or by addition of these epoxides, preferably of ethylene oxide and propylene oxide, optionally mixed or in succession, to starter components having reactive hydrogen atoms, such as water, alcohols, ammonia or amines, for example, ethylene glycol, propylene glycol-1,3 or propylene glycol-1,2, trimethylolpropane, glycerol, sorbitol,4,4'-dihydroxydiphenylpropane, aniline, ethanolamine or ethylenediamine. Sucrose polyethers such as are described, for example, in the German Patent Applications DE-AS 1 176 358 and 1 064 938, as well as polyethers started on formite or fornoses (German Patent Applications DE-OS 2 639 983 or 2 737 951), are suitable according to the invention. In many cases those polyethers are preferred which possess predominantly primary OH groups (up to 90 wt. %, referred to all OH groups existing in the polyether). Polybutadienes possessing OH groups are also suitable according to the invention.

b) Among the polythioethers, mention may be made in particular of the condensation products of thioglycol with itself and/or with other alkylene glycols, formaldehyde or aminoalcohols. Depending on the co-components, the products are, for example, mixed polythioethers.

c) Suitable polyacetals are, for example, the compounds which can be prepared from alkylene glycols, such as diethylene glycol, triethylene glycol, 4,4'-dihydroxydiphenylpropane, hexanediol and formaldehyde. Suitable polyacetals for use according to the invention can also be prepared by polymerisation of cyclic acetals such as, for example, trioxane (German Patent Application DE-AS 1 694 128).

Conventional additives such as plasticisers, release agents, stabilisers such as, for example, UV absorbers or antioxidants, intumescent agents (flameproofing agents), reinforcing fibres such as glass fibres, carbon fibres or aramid fibres, fillers, inorganic and organic pigments, ceramic raw materials, carbon black et cetera, can also be added to the polysulphone block copolycondensates according to the invention, preferably in quantities of from 0 to 80 wt. %, preferred 0 to 60 wt. %, referred to polysulphone block copolycondensate equal to 100%, usefully prior to the processing of the polysulphone block copolycondensate according to the invention into moulded shapes and films.

EXAMPLES

Components used

| | |
|---|---|
| PEG 8,000 | Polyethylene glycol (Breox 8,000; product of the firm Shell) |
| PTHF 4,500 | Polytetrahydrofuran (Terathane 4,500; product of the firm DuPont) |
| Bisphenol A | 2,2-bis(4-hydroxyphenyl)propane |
| TMC-bisphenol | 1,1-bis(4-hydroxyphenyl)-3,3,5-trimethylcyclohexane |

Comparative Example 1 (without polyethylene glycol block)

| Components | | | |
|---|---|---|---|
| 1 | 124.16 g | 400 mmol | TMC-bisphenol |
| 2 | 240.00 g | | Dimethyl sulphoxide |
| 3 | 290.00 g | | Chlorobenzene |
| 4 | 70.77 g | 802 mmol | 45.33% sodium hydroxide solution |
| 5 | 112.00 g | 390 mmol | 4,4'-dichlorodiphenyl sulphone (50% in dried chlorobenzene) |
| 6 | 1.15 g | 4 mmol | 4,4'-dichlorodiphenyl sulphone (50% in dried chlorobenzene) |
| 7 | 0.87 g | 3 mmol | 4,4'-dichlorodiphenyl sulphone (50% in dried chlorobenzene) |
| 8 | 0.87 g | 3 mmol | 4,4'-dichlorodiphenyl sulphone (50% in dried chlorobenzene) |

Apparatus:

Components 1 to 3 are placed in a 1 l surface-ground vessel equipped with heatable jacket, bottom discharge valve and anchor mixer, a water separator for heavy solvents having a reflux condenser and vapour thermometer attached thereon and a 30 cm molecular sieve column (4 Å) connected in series, internal thermometer, a heatable 250 ml dropping funnel and an 100 ml dropping funnel, with a stream of nitrogen at a rate of 10 l $N_2$/hour being passed thereover. The oil thermostat for heating the reactor is adjusted to an operating temperature of 170° C. The stirrer mechanism of the anchor mixer is equipped with a torque sensor for detection of the viscosity (Rheosyst 1,000 from the firm Coesfeld). A rate of rotation of 300 rev/min is established initially.

Preparation of bisphenolate:

Starting at an internal temperature of 75° C., component 4 is added within 10 minutes through the 100 ml dropping funnel and then rinsed with 20 ml of chlorobenzene. Reflux commences at an internal temperature of 115° C.; the temperature is raised to 140° C. within a period of one hour by rotating out the water. After removal of the water in the water separator, the quantity of chlorobenzene distilled off is returned to the reaction vessel through the molecular sieve column. When the water content of the chlorobenzene distilled off, determined by Karl Fischer titration, is less than 0.25%, chlorobenzene is distilled off within about 20 minutes, until the internal temperature has risen to 145° C.

Polycondensation:

The solution of component 5, at a temperature of 80° C., is added within about 20 minutes from the dropping funnel, which is heated by 1.6 bar steam, and the dropping funnel is rinsed using 20 ml of warm chlorobenzene from the separator. Chlorobenzene is carefully distilled off, about 210 g (oil thermometer at 180° C.), until an internal temperature of 155° C. is attained. This temperature is maintained for an hour, then the solution of component 6, at a temperature of 80° C., is added from the heated dropping funnel, the latter rinsed with warm chlorobenzene from the separator, and further stirred for about 60 minutes until the increase in viscosity levels out, as indicated by the torque sensor of the stirrer. Solutions 7 and 8 are added in an identical manner. After the increase in viscosity has levelled out following the third addition, the reaction solution is stirred at 155° C. for about one more hour.

Working up:

The reaction mixture is cooled to 80° C., diluted with about double the quantity of chlorobenzene distilled off—520 g—and pumped into a 5 liter reactor via the bottom discharge of the reactor. Two liters of water are added to the reaction mixture, which is acidified to pH 2 using acetic acid. After the aqueous phase has been separated off—dichloromethane is added to improve phase separation—the organic phase is washed with water until the conductivity of the wash water is less than 0.1 microSiemens.

The solution containing the product is placed in ethanol and the polymer is precipitated out. After being dried in a vacuum for 12 hours at 100° C., the polymer is dissolved in dichloromethane. Cast films are prepared from the solution for characterisation of the polymer; the results are shown in Table 2.

Comparative Example 2 (without polyethylene glycol block)

| 1 | 91.32 g | 400 mmol | Bisphenol A |
| 2 | 240.00 g | | Dimethyl sulphoxide |
| 3 | 290.00 g | | Chlorobenzene |
| 4 | 71.70 g | 802 mmol | 44.74% sodium hydroxide solution |
| 5 | 112.00 g | 390 mmol | 4,4'-dichlorodiphenyl sulphone (50% in dried chlorobenzene) |
| 6 | 1.15 g | 4 mmol | 4,4'-dichlorodiphenyl sulphone (50% in dried chlorobenzene) |
| 7 | 0.87 g | 3 mmol | 4,4'-dichlorodiphenyl sulphone (50% in dried chlorobenzene) |
| 8 | 0.87 g | 3 mmol | 4,4'-dichlorodiphenyl sulphone (50% in dried chlorobenzene) |

This product not according to the invention is prepared by the method in Comparative Example 1; TMC bisphenol is replaced by bisphenol A.

Example 1 (according to the invention)

Solution A:

| 1 | 53.77 g | 6.7 mmol | Polyethylene glycol 8,000 (Breox 8,000) |
| 2 | 100 g | | Dimethyl sulphoxide |
| 3 | 2.43 g | 14 mmol | 30% sodium methylate solution |

Solution B:

| 4 | 122.08 g | 393 mmol | TMC bisphenol |
| 5 | 240.00 g | | Dimethyl sulphoxide |
| 6 | 290.00 g | | Chlorobenzene |
| 7 | 70.80 g | 802 mmol | 45.33% sodium hydroxide solution |

Polycondensation:

| 8 | 112.00 g | 390 mmol | 4,4'-dichlorodiphenyl sulphone (50% in dried chlorobenzene) |
| 9 | 1.15 g | 4 mmol | 4,4'-dichlorodiphenyl sulphone (50% in dried chlorobenzene) |
| 10 | 0.87 g | 3 mmol | 4,4'-dichlorodiphenyl sulphone (50% in dried chlorobenzene) |
| 11 | 0.87 g | 3 mmol | 4,4'-dichlorodiphenyl sulphone (50% in dried chlorobenzene) |

Apparatus:

Components 4 to 6 are placed in a 1 l surface-ground vessel equipped with heatable jacket, bottom discharge valve and anchor mixer, a water separator for heavy solvents having a reflux condenser and vapour thermometer attached thereon and a 30 cm molecular sieve column (4 Å) connected in series, internal thermometer, a heatable 250 ml dropping funnel and an 100 ml dropping funnel, with a stream of nitrogen at a rate of 10 l $N_2$/hour being passed thereover. The oil thermostat for heating the reactor is adjusted to an operating temperature of 170° C. The stirrer mechanism of the anchor mixer is equipped with a torque sensor for detection of the viscosity (Rheosyst 1,000 from the firm Coesfeld). A rate of rotation of 300 rev/min is established initially.

Solution A (disodium salt of polyethylene glycol 8,000):

Components 1 to 3 are placed in a distillation apparatus and methanol is distilled off at normal pressure until a temperature of about 85° C. is attained at the bottom of the column.

Component B: preparation of bisphenolate:

Starting at an internal temperature of 75° C., component 4 is added within 10 minutes through the 100 ml dropping funnel and then rinsed with 20 ml of chlorobenzene. Reflux commences at an internal temperature of 115° C.; the temperature is raised to 140° C. within a period of one hour by rotating out the water. After removal of the water in the water separator, the quantity of chlorobenzene distilled off is returned to the reaction vessel through the molecular sieve column. When the water content of the chlorobenzene distilled off, determined by Karl Fischer titration, is less than 0.25%, chlorobenzene is distilled off within about 20 minutes, until the internal temperature has risen to 145° C.

Addition of solution A:

The solution of the disodium salt of polyethylene glycol 8,000 in dimethyl sulphoxide is added at 100° C.

Polycondensation:

The solution of component 8, at a temperature of 80° C., is added within about 20 minutes from the dropping funnel, which is heated by 1.6 bar steam, and the dropping funnel is rinsed using 20 ml of warm chlorobenzene from the separator. Chlorobenzene is carefully distilled off, about 210 g (oil thermometer at 180° C.), until an internal temperature of 155° C. is attained. This temperature is maintained for an hour, then the solution of component 9, at a temperature of 80° C., is added from the heated dropping funnel, the latter rinsed with warm chlorobenzene from the separator, and further stirred for about 60 minutes until the increase in viscosity levels out, as indicated by the torque sensor of the stirrer. Solutions 10 and 11 are added in an identical manner. After the increase in viscosity has levelled out following the third addition, the reaction solution is stirred at 155° C. for about one more hour.

Working up:

The reaction mixture is cooled to 80° C., diluted with about double the quantity of chlorobenzene distilled off —0.7 l—and pumped into a 5 liter vessel via the bottom discharge of the reactor. Two liters of water are added to the reaction mixture, which is acidified to pH 2 using acetic acid. After the aqueous phase has been separated off—0.7 l of dichloromethane is added to improve phase separation—the organic phase is washed with water until the conductivity of the wash water is less than 0.1 microSiemens. The solution of the product is placed in ethanol and the polymer is precipitated out. After being dried in a vacuum for 12 hours at 100° C., the polymer is dissolved in dichloromethane. Cast films are prepared from the solution for characterisation of the polymer; for data, see Table.

Examples 2 to 5

The polysulphone/polyether block copolycondensates according to the invention are prepared using the components listed in the following table and the quantities given in each case, in accordance with the directions in Example 1.

TABLE 1

Composition of the polysulphone/polyether block co-condensates

| | Polyether proportion Wt. % | Polyether | Quantity | Bisphenol | Quantity | Sulphone | Quantity |
|---|---|---|---|---|---|---|---|
| Example 2 | 34.4 | PEG 8,000 | 107.54 G (0.014 mol) | TMC bisphenol | 120.0 g (0.387 mol) | Dichlorodiphenyl sulphone | 114.89 g (0.400 mol) |
| Example 3 | 44.4 | PEG 8,000 | 161.31 g (0.020 mol) | TMC bisphenol | 117.92 g (0.380 mol) | Dichlorodiphenyl sulphone | 114.89 g (0.400 mol) |
| Example 4 | 60 | PEG 8,000 | 294.08 g (0.037 mol) | TMC bisphenol | 112.02 g (0.363 mol) | Dichlorodiphenyl sulphone | 114.89 g (0.400 mol) |
| Example 5 | 38.34 | PEG 8,000 | 107.54 g (0.014 mol) | Bisphenol A | 88.26 g (0.387 mol) | Dichlorodiphenyl sulphone | 114.89 g (0.400 mol) |

TABLE 2

Results

| | Incorporation of polyether from $^1$H-NMR[1] | | Relative viscosity[2] | Tensile strength[3] MPa | Elongation at break % | $T_{on}$ (TMA)[4] °C. | $T_{1/2}$ (TMA)[4] °C. | $T_g$[5] °C. | Decomposition by TGA[6] °C. | Polar proportion of surface tension[7] mN/m |
|---|---|---|---|---|---|---|---|---|---|---|
| Sample | Is/% | Should be/% | | | | | | | | |
| Comparative Example 1 | 0 | 0 | 1.244 | 24 | 4 | 216 | 268 | — | — | 1.03 |
| Example 1 | 19.2 | 20 | 1.350 | 49.8 | 5 | 193 | 214 | — | 382 | 6.26 |
| Example 2 | 31.8 | 34.4 | 1.290 | 38.0 | 311 | 131 | 153 | 71.7 | 396 | 7.73 |
| Example 3 | 42.2 | 44.4 | 1.348 | 34.1 | 405 | 92 | 120 | −47.1 | — | 9.15 |
| Example 4 | 56.8 | 60 | 1.314 | 27.8 | 3 | 50 | 55 | −31.1 | — | 11.42 |
| Comparative Example 2 | 0 | 0 | 1.174 | 53.7 | 8 | 160 | 183 | — | — | 4.83 |
| Example 5 | 35.8 | 38.34 | 1.316 | 35.8 | 390 | 65.5 | 89.0 | — | — | 22.42 |

Table 2 shows that the examples according to the invention have distinctly lower melting and softening temperatures than those of the corresponding comparative examples and can therefore be processed far better and technically relatively easily extruded, for example, to form catheter tubes.

It follows from the distinctly higher polar proportion of the surface tension that the examples according to the invention have a distinctly better blood compatibility than that of the comparative examples. Moreover the examples according to the invention are distinguished by a better elongation at break (especially Examples 2 and 3) and tensile strength.

[1] Determination of the proportion of polyether segments

The incorporation of polyether segments into the polymers was calculated from the intensities of the signals at $\delta=6.8$ to 7.8 ppm and at $\delta=3.6$ ppm, in accordance with the following formula. Owing to the chloroform (solvent) signal also present in the region of $\delta=6.8$ to 7.8 ppm, the signal intensity of the aromatic protons is too high, that is, the measured ratio is too high and the content of incorporated polyethers thus detected is determined as too low.

$$V = \frac{I_{\delta=6.8-7.8\,ppm}}{I_{\delta=3.6\,ppm}}$$

$$V = 2 \cdot \frac{M_{PE\,unit}}{M^*_{sulphone} + M^*_{Bisphenol}} \cdot \left[ \frac{1}{M^*_{PE}} \cdot (M^*_{Bisphenol} M^*_{sulphone}) + \frac{2}{PE} - 2 \right]$$

$I_{\delta=6.8-7.8\,ppm}$ signal intensity of the protons of the aromatic bisphenol and sulphone components (16 protons)

$I_{\delta=3.6\,ppm}$ signal intensity of the protons of the methyl groups of polyethylene glycol (4 protons)

$PE$ polyether content $M^*_{PE}$ molar mass of the polyether component decreased by 2 hydrogen atoms $M^*_{bisphenol}$ molar mass of the bisphenol component decreased by 2 hydrogen atoms $M^*_{sulphone}$ molar mass of the sulphone component decreased by 2 hydrogen atoms $M_{PE\,unit}$ molar mass of the polyether repeat unit Polysulphone/polyether block copolycondensates based on: TMC bisphenol, PEG 2,000, 4,4'-dichlorodiphenyl sulphone, polyether proportion 20 wt. %.

| | | |
|---|---|---|
| $PE$ | = | 0.2 |
| $M^*_{PE}$ | = | 1998 g/mol |
| $M^*_{bisphenol}$ | = | 308.2 g/mol |
| $M^*_{sulphone}$ | = | 216.3 g/mol |
| $M_{PE\,unit}$ | = | 44.0 g/mol |

If these data are used, the following simplified formula for the intensity ratio as a function of the polyether content is obtained:

$$V = 0.336 \cdot \frac{1}{PE} - 0.328$$

or for polysulphone/polyether block copolycondensates based on: TMC bisphenol, PTHF 4,500, 4,4'-dichlorodiphenyl sulphone, polyether proportion 20 wt. %.

| | | |
|---|---|---|
| $PE$ | = | 0.2 |
| $M^*_{PE}$ | = | 5471 g/mol |
| $M^*_{bisphenol}$ | = | 308.2 g/mol |
| $M^*_{sulphone}$ | = | 216.3 g/mol |
| $M_{PE\,unit}$ | = | 72.1 g/mol |

If these data are used, the following simplified formula for the intensity ratio as a function of the polyether content is obtained:

$$V = 0.5957 \cdot \frac{1}{PE} - 0.5907$$

[2] relative viscosity: 0.5 g/100 ml solution in dichloromethane

[3] tensile strength, determined on cast films from a 15% solution in dichloromethane 4) *TMA:* thermomechaical analysis:    $T_{on}$: tangential section method $T_{1/2}$: half depth of penetration 5) $T_g$: glass temperature of the soft segment 6) *TGA:* thermogravimetric analysis:    Determination of the decomposition temperature Thermostability (without shear)

In order to investigate the thermal stability of the melt, isothermal thermoanalyses were recorded at 240° C. in air and in nitrogen using the measuring device TG 50 from the firm Mettler. The polysulphone/polyether block copolycondensate from Example 4 exhibited a weight loss of 0.7% after 30 minutes of heating in atmospheric air and a weight loss of 1.2% in an atmosphere of nitrogen, with the measured curves approaching this value asymptotically.

This proves the thermal stability of the polysulphone/polyether block copolycondensate even under atmospheric processing conditions.

Time-dependent melting viscosity (with shear), measured at constant shear rate.

Over the measuring period of 16 minutes, at $D=2.26\ s^{-1}$ and at 150° C. and 180° C. materials temperatures respectively, the melt had a constant melting viscosity of 1,130 Pa.s and 120 Pa.s respectively.

We claim:

1. Polysulphone/polyether block copolycondensates having the recurring structural unit as in formula (I)

$$-(-O-E-O-Ar^1-SO_2-Ar^2-)-W- \qquad (I)$$

wherein

E signifies a divalent diphenolate radical, $Ar^1$ and $Ar^2$ are identical or different difunctional aromatic radicals having 6 to 50 carbon atoms and W represents a polyether, polythioether or polyacetal possessing at least two hydroxyl groups and having an average molecular weight ($\overline{M}_n$) of from 400 to 30,000, wherein the proportion of the radical W in the total block copolycondensate amounts to 5 to 99 wt. %.

2. Polysulphone/polyether block copolycondensates according to claim 1 wherein

E represents a radical of formula (II)

$$-O-\underset{(R^1)_n}{\underset{|}{\bigcirc}}-X-\underset{(R^1)_n}{\underset{|}{\bigcirc}}-O- \qquad (II)$$

wherein $R^1$ in each case independently of one another, identically or differently, represents hydrogen, halogen, $C_1$–$C_6$ alkyl or $C_1$–$C_6$ alkoxy, n represents an integer from 1 to 4, X stands for a chemical bond, —CO—, —O—, —S—, —SO$_2$—, for alkylene, alkylidene or cycloalkylene, with the three last-named radicals being substitutable by substituents selected from halogen, phenyl, naphthyl substituted by halogen, $C_1$–$C_4$ alkyl and/or $C_1$–$C_4$ alkoxy and with cycloalkylene being substitutable in addition by $C_1$–$C_4$ alkyl, $Ar^1$ and $Ar^2$ represent identical or different difunctional radicals having 6 to 25 carbon atoms.

3. Polysulphone/polyether block copolycondensates according to claim 2, wherein

X represents a radical of formula (III), $$\underset{R^2\ \ \ R^3}{\overset{-C-}{\bigcirc_{(Y)_m}}} \qquad (III)$$

wherein

Y represents carbon, $R^2$ and $R^3$ represent, individually selectable for each Y, independently of one another, hydrogen or $C_1$–$C_6$ alkyl, m represents an integer from 3 to 12.

4. Method for the preparation of the polysulphone/polyether block copolycondensates according to claim 1 by the reaction of dialkyl diphenolates of formula (IIa)

$$\text{alkali—O—E—O—alkali} \qquad (IIa)$$

wherein E has the meaning given in claim 1, and di-salts of hydroxy-terminated polyethers of formula (IIIa)

$$\text{Me—O—W—O—Me} \qquad (IIIa),$$

wherein

Me represents alkali metal, alkaline earth metal or zinc and

W has the meaning given in claim 1, with dihalodiarvi sulphones of formula (IVa)

$$\text{hal—Ar}^1\text{—SO}_2\text{—Ar}^2\text{—hal} \qquad (IVa),$$

wherein $Ar^1$ and $Ar^2$ have the meaning given in claim 1 and hal represents halogen, in the presence of polar solvents.

5. Moulded shapes, produced from polysulphone/polyether block copolycondensates according to claim 1.

6. A molded shape as claimed in claim 5 comprising a membrane.

7. A molded shape as claimed in claim 5 comprising a catheter tube.

\* \* \* \* \*